United States Patent Office 3,614,989
Patented Oct. 26, 1971

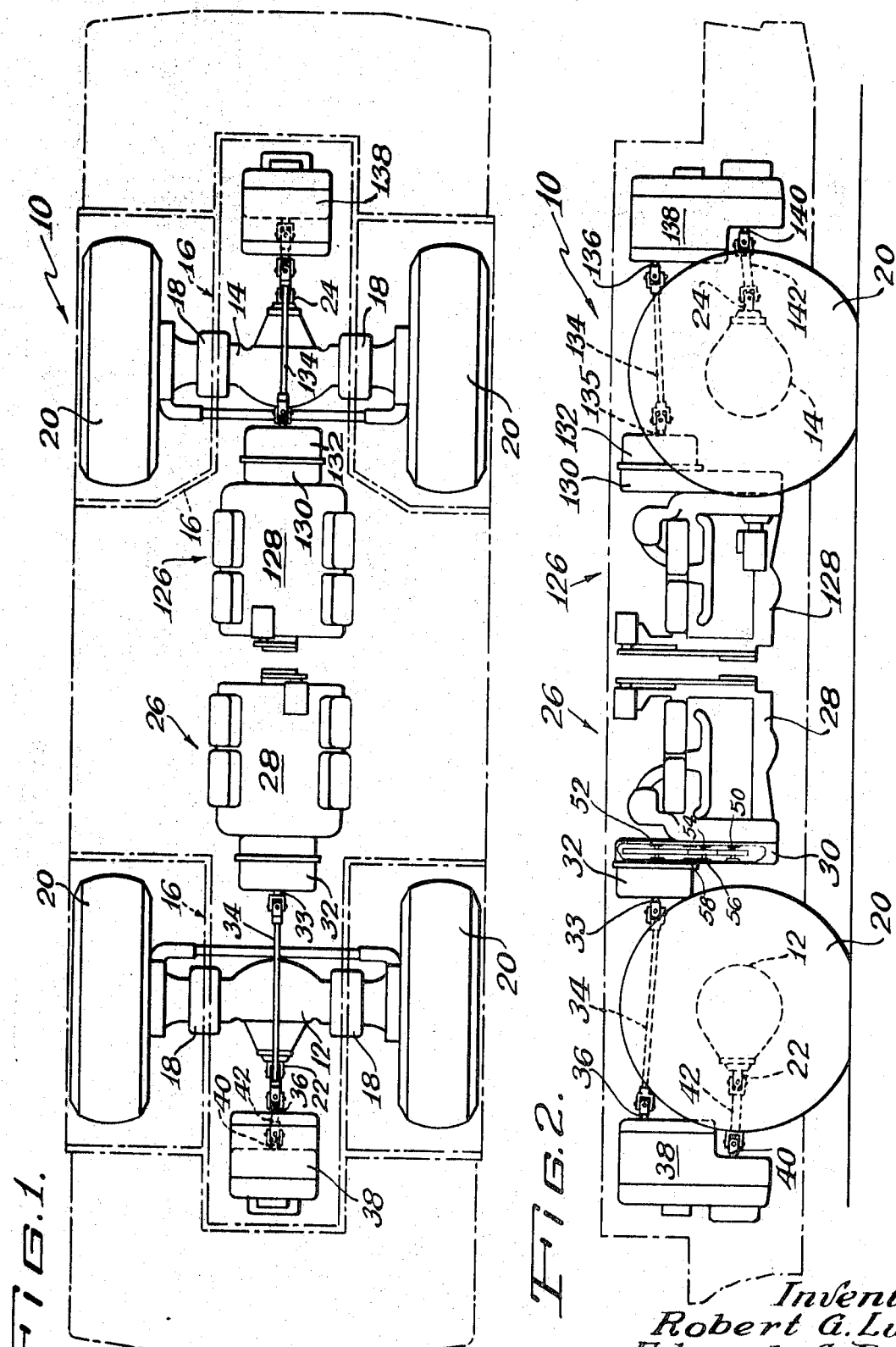

3,614,989
DRIVE TRAIN FOR LOW PROFILE VEHICLE
Edward A. Bott, Crystal Lake, and Robert G. Luft, Wildwood, Ill., assignors to International Harvester Company, Chicago, Ill.
Filed Feb. 4, 1969, Ser. No. 796,371
Int. Cl. B60k 5/08
U.S. Cl. 180—44 R
13 Claims

ABSTRACT OF THE DISCLOSURE

A high powered, low profile vehicle having a pair of engines arranged end-to-end between the axles, each engine drivingly connected to the adjacent axle through a transfer drive and a torque converter to a transmission located on the opposite side of the adjacent axle.

---

The towing and ground manipulation of aircraft requires a specially designed machine. Such a machine must have sufficient drawbar power to move the aircraft at acceptable ground speeds, must be maneuverable in both forward and reverse directions, must be relatively low in order that the machine can go under the wings and most other appendages on the aircraft, and desirably has a relatively flat top surface which may function as an elevated working platform. As aircraft become larger and larger, the need for more drawbar power increases but the requirement for maneuverability does not correspondingly decrease.

It is therefore an object of the present invention to provide a vehicle with a high drawbar output while maintaining a relatively low profile.

It is also an object of this invention to provide a vehicle having two identical power trains so that the vehicle will remain maneuverable even though there is a failure of one of the power train systems.

These and other objects of the present invention and many of the attendant advantages thereof will become more readily apparent upon perusal of the following description and the accompanying drawings, wherein:

FIG. 1 is a top plan view of a vehicle having a drive train arrangement according to the present invention; and FIG. 2 is a side elevational view of the vehicle of FIG. 1.

Referring now to the drawing, there is shown a vehicle, indicated generally at 10, having a pair of axles 12 and 14. Each axle, 12 and 14, is attached to the vehicle frame 16, indicated by dotted lines, through securing pads 18, and are supported by ground-engaging wheels 20. The axles 12 and 14 include a differential which is driven through differential input shafts 22 and 24, respectively. Power is supplied to each of the differential input shafts 22 and 24 through separate but essentially identical drive train 26 and 126, respectively. Since the two drive trains are identical mirror images of each other, a detailed description of only one such drive train will be sufficient for a complete understanding. Following is a description of the drive train identified by the numeral 26 and it is to be understood that corresponding components in the drive train identified as 126 will be identified by the same number but with the numeral 1 prefixed thereto.

An internal combustion engine 28 is connected to drive the input to a transfer mechanism 30. A torque converter 32 is driven by the output from the transfer mechanism. This transfer mechanism 30 is preferably of the three-shaft gear type, i.e. an input shaft 50, an output shaft 52 and an intermediate shaft 54 bearinged in the mechanism 30, with the intermediate shaft being selectively positionable at two locations 56 or 58 between the input and output shafts and each shaft replaceably mounting gears, so that it is possible to achieve either a 1-to-1 ratio between the input to the transfer mechanism and the output of the transfer mechanism or to achieve some gear reduction in order to match the rated speed of the engine 28 to the design input speed of the torque converter. This would permit some flexibility in the selection of the type of engine utilized as a power source. For example, if a Diesel engine is used with a rated speed of 2200 r.p.m. and the torque converter input is designed for maximum efficiency at 2200 r.p.m. then the gearing in transfer mechanism 30 would be selected so that a 1-to-1 ratio between input and output is achieved in order that the torque converter will be driven at its design speed. However, if it is desired to use a gasoline engine with a rate of speed of 3600 r.p.m. the gearing in the transfer mechanism could be changed so the 3600 r.p.m. input to the transfer mechanism would be reduced to the desired r.p.m. at the output of the transfer mechanism, which would be the desired input to the torque converter 32. The output shaft 33 of the torque converter is coupled to the input shaft 36 of the transmission 38 through a drive shaft 34, while the output shaft 40 is connected to the differential input shaft 22 through a stub drive shaft 42. In order to achieve a compact design with a low silhouette or profile, it is desirable to place the engine inboard of the axle to be driven thereby and to position the transmission outboard on the other side of the axle to be driven, and to extend the drive shaft 34 which connects the torque converter 32 with the transmission 38 over the top of the axle 12. Hence the engine can be positioned within the frame so that the lower portion of the engine is below the centerline of the axle.

Since the two engines 38, 138 are identical, although oriented with their output shafts pointing in opposite directions, it is apparent that the direction of rotation of these two engines will be opposite to each other. In order that there be coordination between the driving effort of the two axles 12 and 14, assuming that all ground-engaging wheels are of the same diameter, it is necessary that the two transmissions 38 and 138 be of the full reversing type. That is, transmissions 38 and 138 should have the same ratios forward as they do in reverse. With this relationship present in the two transmissions one transmission can be conditioned for forward drive and the other conditioned for reverse drive and the speed of the wheels driven by both axles will therefore be the same, assuming that the transmissions are both conditioned for the same range or ratio.

While a preferred embodiment of the present invention has been shown and described herein, it will be apparent that various modifications and changes may be made therein without departing from the invention.

What is claimed is:

1. In a vehicle having a frame and a pair of axles including differential input means supported by ground-engaging wheels, the improvement comprising:
   a pair of engines supported on the vehicle frame between the axles and arranged in tandem;
   a drive train extending from each engine to the differential input means on the adjacent axle, each drive train including:
   a transfer drive means connected to and driven by the engine;
   a torque convertor driven by the transfer drive means;
   a transmission positioned on the frame on the side of the axle opposite the engine;
   said transmission having an input shaft and an output shaft spaced from and at an elevation substantially below the input shaft;
   first shaft means extending between the torque converter and said input shaft;
   said first shaft means extending over the top of the axle; and second shaft means extending between said output shaft and the differential input means.

2. In a vehicle according to claim 1 wherein said ground-engaging wheels are of the same diameter and said transmission has step ratios in a forward direction which are the same as the step ratios in a reverse direction.

3. In a vehicle according to claim 2 wherein said engine has a lower portion which extends below the centerline of the axle.

4. In a vehicle according to claim 3 wherein said transfer drive means comprises an input shaft, an output shaft, and an intermediate shaft, said intermediate shaft being selectively positionable at two locations between said input and output shafts; and gears replaceably mounted on said shafts; whereby the rated speed of the engine can be matched to the design speed of the torque convertor.

5. In a vehicle having a frame and a pair of axles including differential input means supported by ground-engaging wheels, the improvement comprising:
    engine means including crankshaft means supported on the vehicle frame between the axles;
    a drive train extending from the engine means to the differential input means on the axles; the drive train including:
    transfer drive means connected to and driven by the engine, said drive means having an output means above said crankshaft means;
    torque convertor means connected to and driven by the output means;
    transmission means positioned on the frame on the outward side of the axles, said transmission means having an input shaft and an output shaft vertically spaced below the input shaft;
    first shaft means extending between the torque convertor and said input shaft, said first shaft means extending over the top of the axle; and
    second shaft means extending between said output shaft and the differential input means.

6. The invention according to claim 5 wherein said ground-engaging wheels are of the same diameter and said transmission means has step ratios which are equal in both forward and reverse directions.

7. The invention according to claim 6 wherein said engine means extends below the centerline of the axles.

8. The invention according to claim 7 wherein said transfer drive means comprises an input shaft, an output shaft, and an intermediate shaft, said intermediate shaft being selectively positionable at two locations between said input and output shafts; and gears replaceably mounted on said shafts; whereby the rated speed of the engine can be matched to the design speed of the torque convertor.

9. In a vehicle having a frame and a pair of axles including a differential input means supported by ground-engaging wheels, the improvement comprising:
    a pair of engines supported on the vehicle frame between the axles and arranged in tandem;
    a drive train extending from each engine to the differential input means on the adjacent axle, each drive train including;
    a transfer drive means affixed to and driven by the engine, said drive means having an output means substantially above said connection with the engine;
    a torque convertor affixed to the transfer drive means and driven by the output means;
    the transmission positioned on the frame on the side of the axle opposite the engine;
    said transmission having an input shaft and an output shaft vertically spaced below the input shaft;
    first shaft means extending between the torque convertor and said input shaft, said first shaft means extending over the top of said axle; and
    second shaft means extending between said output shaft and the differential input means.

10. The invention according to claim 9 wherein said ground-engaging wheels are the same diameter and said transmission has equal step ratios in both forward and reverse directions.

11. The invention according to claim 10 wherein said engine has a lower portion which extends below the center line of the axle.

12. The invention according to claim 11 wherein said transfer drive means comprises an input shaft, an output shaft, and an intermediate shaft, said intermediate shaft selectively positionable at two locations between said input and output shafts; and gears replaceably mounted on said shafts; whereby the rated speed of the engine can be matched to the design speed of the torque convertor.

13. A compact drive train system for a vehicle having a frame and a pair of axles, each of which includes a differential having a differential input means comprising:
    a pair of engines positioned on the frame between the axles;
    a drive train extending from each engine to the adjacent axle, each drive train including:
    a transfer drive means connected to and driven by the engine and having a transfer output means substantially above the driven connection with the engine;
    a transmission mounted on the frame on the side of said adjacent axle opposite to the engine, and having a transmission input means and a transmission output means positioned at an elevation below the transmission input means;
    first drive means including a torque convertor drivingly connected between the transfer output means and the transmission input means, and extending over the axle; and
    second drive means drivingly connected between the transmission output means and the differential input means.

References Cited
UNITED STATES PATENTS

| | | | |
|---|---|---|---|
| 2,347,882 | 5/1944 | Choate et al. | 180—51 X |
| 2,941,611 | 6/1960 | Norrie | 180—45 |
| 3,006,199 | 10/1961 | Christenson et al. | 180—70 UX |
| 3,064,746 | 11/1962 | Williamson | 180—70 X |
| 3,135,529 | 6/1964 | Conrad | 180—52 X |
| 3,132,536 | 5/1964 | Sampietro | 180—70 X |

FOREIGN PATENTS

| | | | |
|---|---|---|---|
| 1,061,131 | 3/1967 | Great Britain | 180—44 |

A. HARRY LEVY, Primary Examiner

U.S. Cl. X.R.
180—54 C, 70 R